(12) United States Patent  
Anantharam et al.

(10) Patent No.: US 9,237,072 B2
(45) Date of Patent: *Jan. 12, 2016

(54) PARTITIONING A NETWORK INTO MULTIPLE SWITCHING DOMAINS

(71) Applicant: International Business Machines Corporation, Armonk, NY (US)

(72) Inventors: Sushma Anantharam, Cupertino, CA (US); Keshav Govind Kamble, Fremont, CA (US); Pramodh Mallipatna, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,690

(22) Filed: Mar. 3, 2015

(65) Prior Publication Data

US 2015/0180718 A1 Jun. 25, 2015

Related U.S. Application Data

(63) Continuation of application No. 13/646,329, filed on Oct. 5, 2012, now Pat. No. 9,042,229.

(60) Provisional application No. 61/544,269, filed on Oct. 6, 2011.

(51) Int. Cl.
*H04L 12/24* (2006.01)
*H04L 12/933* (2013.01)
*H04L 12/721* (2013.01)
*H04L 12/775* (2013.01)
*H04L 12/863* (2013.01)

(52) U.S. Cl.
CPC ............ *H04L 41/0893* (2013.01); *H04L 45/44* (2013.01); *H04L 45/58* (2013.01); *H04L 47/621* (2013.01); *H04L 49/10* (2013.01)

(58) Field of Classification Search
None
See application file for complete search history.

(56) References Cited

U.S. PATENT DOCUMENTS

| | | | |
|---|---|---|---|
| 7,289,513 | B1 | 10/2007 | Medved et al. |
| 7,486,678 | B1 | 2/2009 | Devanagondi et al. |
| 2007/0091903 | A1* | 4/2007 | Atkinson ............... 370/401 |
| 2009/0296715 | A1 | 12/2009 | Dropps et al. |
| 2009/0303880 | A1 | 12/2009 | Maltz et al. |
| 2010/0061391 | A1 | 3/2010 | Sindhu et al. |

* cited by examiner

*Primary Examiner* — Diane Lo
(74) *Attorney, Agent, or Firm* — Schmeiser, Olsen & Watts LLP

(57) ABSTRACT

To partition a distributed fabric system, at least one system port is allocated to each switching domain of multiple non-overlapping switching domains in a distributed fabric system. Multiple different look-up tables are produced, wherein each look-up table corresponds to a different switching domain of the multiple non-overlapping switching domains in the distributed fabric system. Each system port is associated with the look-up table of the multiple look-up tables that corresponds to the switching domain to which that system port is allocated. The look-up table associated with each system port has at least one table entry for each other system port allocated to the same switching domain as that system port.

23 Claims, 9 Drawing Sheets

PARTITIONING A NETWORK INTO MULTIPLE SWITCHING DOMAINS

FIELD OF THE INVENTION

The invention relates generally to data centers and data processing. More particularly, the invention relates to methods and apparatus for partitioning data centers into multiple switching domains.

BACKGROUND

Data centers are generally centralized facilities that provide Internet and intranet services in support of businesses and organizations. A typical data center can house various types of electronic equipment, such as computers, servers (e.g., email servers, proxy servers, and DNS servers), switches, routers, data storage devices, and other associated components. A given data center can be made of different types of switching domains. One type of switching domain can comprise a group of cell-based switches managed through a single traffic management domain. Depending on the kind of switches, the single switching domain can scale up to hundreds of thousands of Ethernet ports. Managed together, all of these switches form one virtual, large, flat (i.e., without hierarchy) switch. Managing such a large switch as a single traffic management domain can present difficulties.

SUMMARY

In one aspect, the invention features a method for partitioning a distributed fabric system into multiple non-overlapping switching domains. The distributed fabric system includes a plurality of switches coupled to a cell-based switching fabric. A logical system port that is globally unique within the distributed fabric system is mapped to each physical network port in the distributed fabric system. Each system port is associated with a look-up table having at least one table entry for each other system port to be allocated to the same switching domain as that system port. Each switch that receives a packet over a given system port is limited to switching the packet to only those other system ports for which the look-up table associated with the given system port has a table entry.

In another aspect, the invention features a switch comprising a plurality of physical network ports for receiving packets, and a network processor in communication with the plurality of physical network ports. The network processor includes a switching device, logic to map a globally unique logical system port to each physical network port, logic to associate each system port with a look-up table having at least one table entry for each other system port to be allocated to the same switching domain as that system port, and logic to limit the switching device to switch a packet received by a given one of the system ports to only those system ports for which the look-up table associated with the given system port has a table entry.

In still another aspect, the invention features a distributed fabric system comprising a plurality of scaled-out fabric coupler (SFC) chassis. Each SFC chassis has a plurality of cell-based SFC fabric ports and a cell-based fabric element for switching cells among the cell-based SFC fabric ports of that SFC chassis. The distributed fabric system further comprises a plurality of switching distributed line cards (DLCs). Each switching DLC includes a plurality of cell-based DLC fabric ports connecting that switching DLC to each of the SFC chassis, a plurality of network ports for receiving packets, and a network processor in communication with the plurality of physical network ports and the cell-based DLC fabric ports. The network processor includes a switching device, logic to map a globally unique logical system port to each physical network port, logic to associate each system port with a look-up table having at least one table entry for each other system port to be allocated to the same switching domain as that system port, and logic to limit the switching device to switch a packet received by a given one of the system ports to only those system ports for which the look-up table associated with the given system port has a table entry.

In yet another aspect, the invention features a computer program product for partitioning a distributed fabric system into multiple non-overlapping switching domains. The distributed fabric system includes a plurality of switches coupled to a switching fabric by cell-based fabric ports. The computer program product comprises a computer-readable storage medium having computer-readable program code embodied therewith. The computer-readable program code comprises computer-readable program code configured to map a logical system port that is globally unique within the distributed fabric system to each physical network port in the distributed fabric system, computer-readable program code configured to associate each system port with a look-up table having at least one table entry for each other system port to be allocated to the same switching domain as that system port, and computer-readable program code configured to limit each switch that receives a packet over a given system port to switching the packet to only those other system ports for which the look-up table associated with the given system port has a table entry.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers can include a cell-based distributed fabric system comprised of a plurality of switches (called Distributed Line Cards or DLCs) coupled to distributed switching fabric boxes (called Scaled up Fabric Coupler or SFCs) by cell-based fabric ports. These DLCs and SFCs can form a single large traffic management domain. A partitioning mechanism, described herein, partitions the distributed fabric system into multiple non-overlapping switching domains. The partitioning mechanism operates to isolate the switching domains from each other such that one switching domain cannot switch the packets belonging to another switching domain.

In brief, the partitioning of the distributed fabric system into multiple non-overlapping switching domains is achieved by mapping a globally unique logical system port to each physical network port in the distributed fabric system and associating each system port with a look-up table that determines the other system ports to which the that system port can switch a packet. Each DLC that receives a packet over a given system port can switch the packet only to those other system ports for which the look-up table associated with the given system port has a corresponding table entry. In effect, the entries of the look-up table of a given system port identifies those other system ports that are members of the same switching domain as the given system port.

Advantageously, the partitioning mechanism facilitates a hosted data center, wherein server racks and top-of-rack switches can be dedicated to individual customers. In addition, the partitioning mechanism enables the implementation of control and management planes for each switching domain partition independently of the planes of every other switching domain partition. Rather than a single control plane and single management plane for a virtual, large, flat switch, which can scale up to 250 thousand Ethernet ports in one switching domain, the multiple independent control and management planes divide the large switching domain into smaller switching domains, thus, simplifying traffic management.

Figure 1:
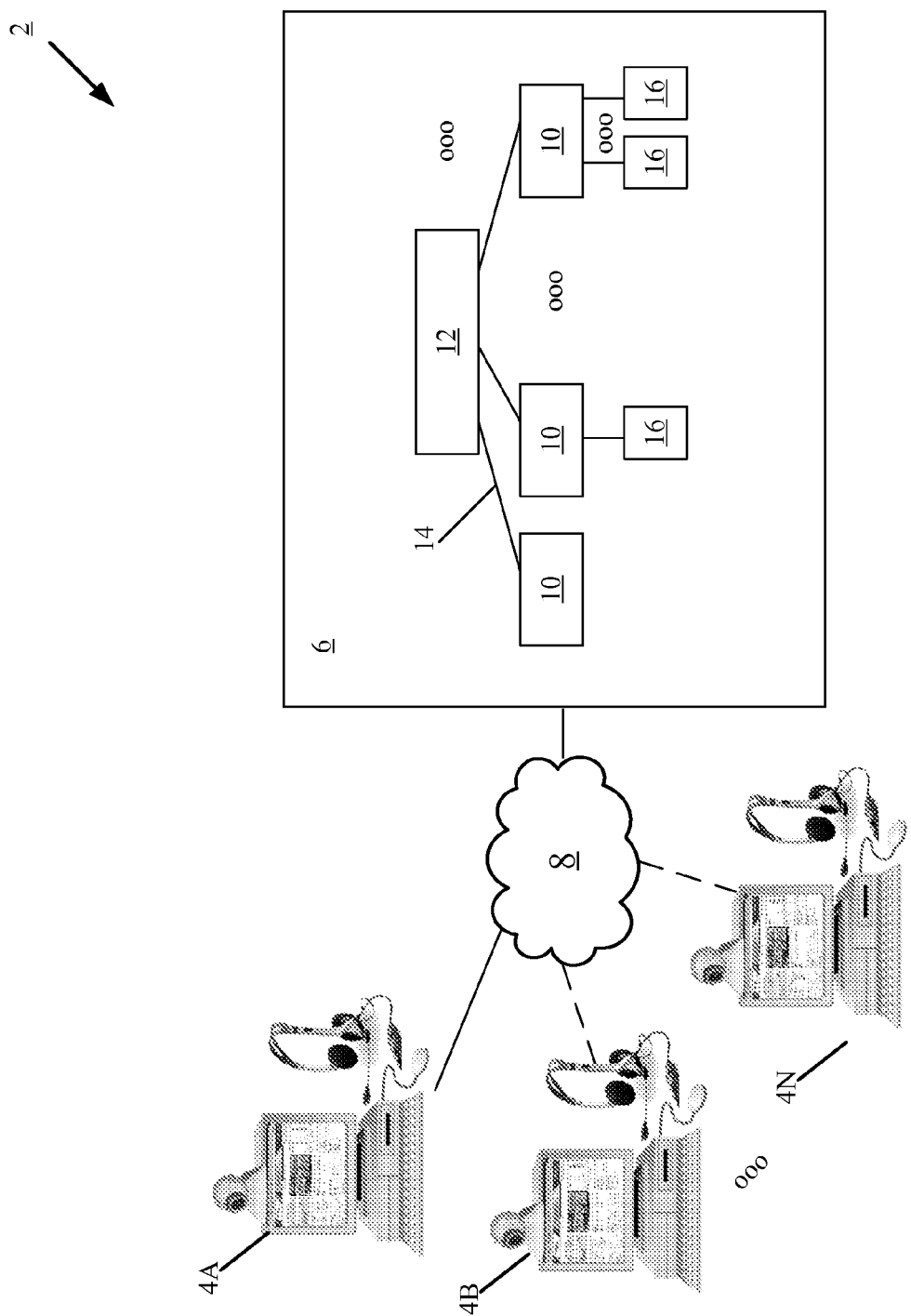
FIG. 1 is an embodiment of a networking environment including a data center with a distributed fabric system.

FIG. 1 shows an embodiment of a networking environment 2 including customer systems 4A, 4B, 4N (generally, 4) in communication with a data center 6 over a network 8. In general, the data center 6 is a facility that houses various computers, routers, switches, and other associated equipment in support of applications and data that are integral to the operation of a business, organization, or other entities. The data center 6 may be embodied at a single site or distributed among multiple sites. Embodiments of the network 8 include, but are not limited to, local-area networks (LAN), metro-area networks (MAN), and wide-area networks (WAN), such as the Internet or World Wide Web.

In this illustrative example, the data center 6 includes a group of cell-based switches 10, also referred to herein as distributed line card (DLC) chassis, in communication with one or more scaled-out fabric coupler (SFC) chassis 12 over communication links 14. Each SFC chassis 12 has one or more cell-based switch fabric elements (not shown) for switching cells among the switches 10. The one or more SFC chassis 12 provide a cell-based switching fabric for the DLCs 10. The DLCs 10 and SFCs 12 together embody a cell-based distributed fabric system that can operate as a single switching domain, or be partitioned into multiple non-overlapping switching domains, as described further herein.

Connected to each of the DLCs 10 are zero, one, or more servers 16. In general, a server 16 is a computer (or group of computers) that provides one or more services to the data center 6, examples of which include, but are not limited to, email servers, proxy servers, DNS servers, control plane servers, and management plane servers.

In the data center 6, functionality of a switching domain occurs generally on three planes: a management plane, a control plane, and a data plane. The management of each switching domain, such as configuration management, runtime configuration management, presentation of information (show and display), graph generation, and handling SNMP (Simple Network Management Protocol) requests, occurs on the management plane. The control plane is associated with those functions involving network signaling and control. In general, the control plane contains the logic used to program the data plane, so that packets are forwarded correctly throughout the distributed fabric system. The data plane manages data flow. In the data center 6, the functionality of the management plane and/or control plane of each switching domain can be centrally implemented at one or more of the servers 16, as described further herein. The functionality of the data plane is distributed among the DLCs 10.

A customer system 4 can provide a centralized point of administration for managing and controlling the DLCs 10 and the SFCs 12. Through a customer system 4, a user or network administrator of the data center 6 can access the control plane and/or management plane running on a server 16 in order to manage a particular switching domain. A graphical user interface (GUI) application executing on a customer system 4 can serve to provide the network administrator with a view of the entire network topology of a switching domain. An example of such a GUI application is Blade Harmony Manager® provided by IBM Corporation of Armonk, N.Y. Although shown outside of the data center 6, one or more of the customer systems 4 may be considered part of the data center 6.

A customer system 4 can connect directly (point-to-point) or indirectly to a given DLC 10 of the data center 6 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet, a customer system 4 can access a command-line interface (CLI) of a given DLC 10 or the control plane and/or management plane of a switching domain.

Figure 2:
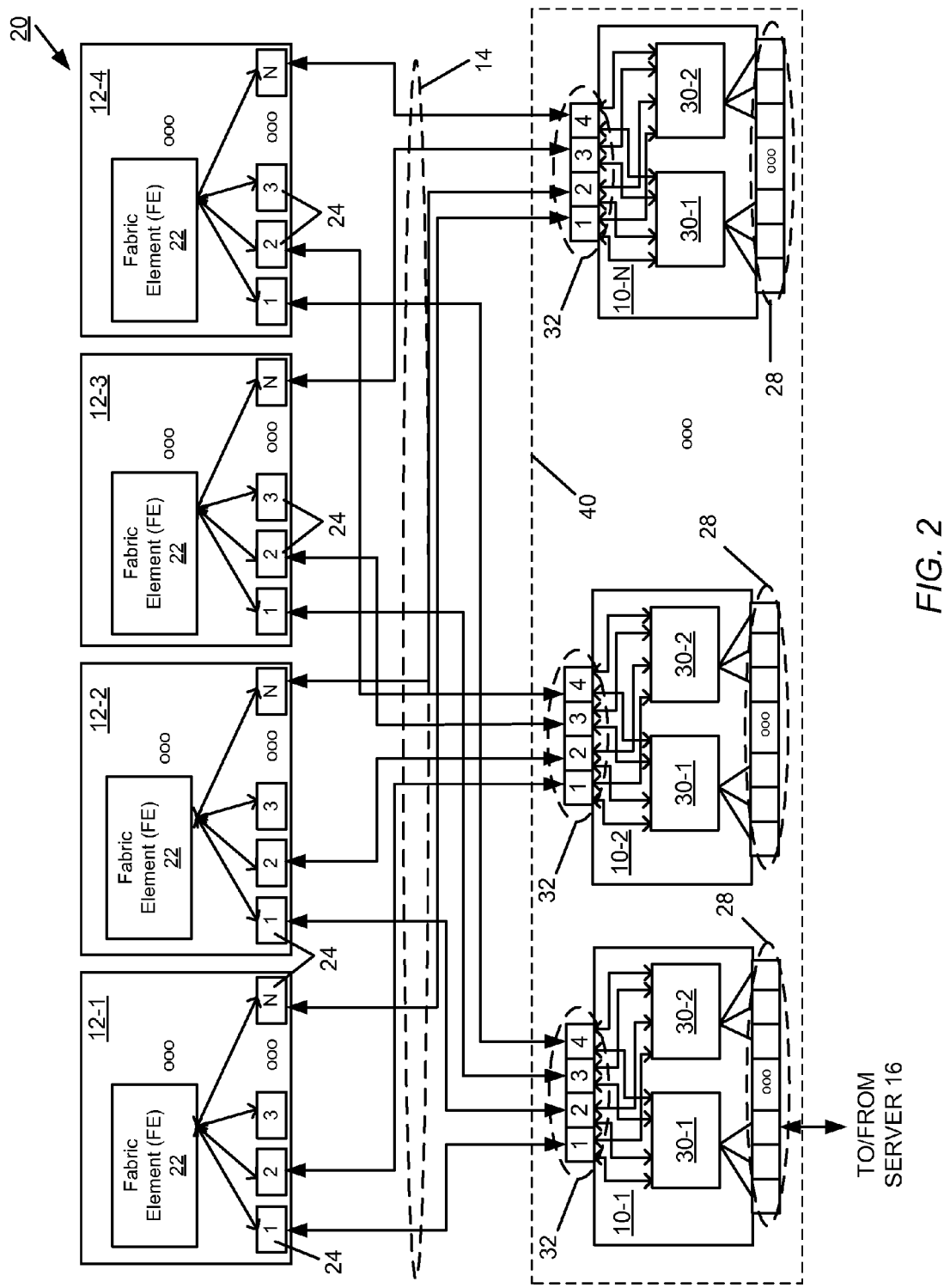
FIG. 2 is a block diagram of an embodiment of the distributed fabric system including a plurality of scaled-out fabric coupler (SFC) chassis interconnected to a plurality of switches configured as a single large switching domain.

FIG. 2 shows an example embodiment of a cell-based distributed fabric system 20 having four independent SFC chassis 12-1, 12-2, 12-3, and 12-4 (generally, 12) in communication with a plurality of cell-based switches or DLCs 10-1, 10-2, 10-N (generally, 10). The number (N) of DLCs 10 can range in the hundreds and thousands. As an example, four 256-fabric port SFC chassis 12 together can connect up to 256 DLCs.

Each SFC chassis 12 includes a set of cell-based switch fabric elements (FE) 22 in communication with N SFC fabric ports 24, there being at least as many SFC fabric ports 24 in each SFC chassis 12 as the number of DLCs 10 in the distributed fabric system 20. Each set of fabric elements 22 corresponds to a CLOS of fabric elements of an SFC chassis 12 that switches cells between fabric ports 24 based on the destination information in the cell header. An example implementation of the switch fabric elements 22 is the BCM 88750, produced by Broadcom, of Irvine, Calif.

Each DLC 10 has network-facing ports 28, network processors 30-1, 30-2 (generally, 30), and fabric-facing ports 32. The network-facing (or network) ports 28 can be in communication with servers 16, with external switching domains, and with the network 8, for example, the Internet. In one embodiment, each DLC 10 has forty network ports 28, with each of the network ports 28 being configured as a 10 Gbps Ethernet port (the aggregate network bandwidth of the DLC 10 is 400 Gbps) that receives Ethernet packets. An example implementation of the network processors 30 is the BCM 88650, produced by Broadcom, of Irvine, Calif.

In this example, the distributed fabric system 20 has a full-mesh configuration: each DLC 10 is in communication with each of the SFCs 12; more specifically, each of the fabric-facing ports 32 (hereafter, switch fabric port 32) of a given DLC 10 is in electrical communication with an SFC fabric port 24 of a different one of the SFCs 12 over a communication link 14. Referring to the DLC 10-1 as a representative example, the switch fabric port 32-1 of the DLC 10-1 is in communication with the fabric port 24-1 of the SFC 12-1, the switch fabric port 32-2 with the SFC fabric port 24-1 of the SFC 12-2, the switch fabric port 32-3 with the SFC fabric port 24-1 of the SFC 12-3, and the switch fabric port 32-4 with the SFC fabric port 24-1 of the SFC 12-4. Connected in this full-mesh configuration, the DLCs 10 and SFCs 12 form a distributed virtual chassis or virtual flat switch, with the DLCs 10 acting as line cards. Such a distributed virtual chassis is modular; that is, DLCs 10 can be added to or removed from the distributed virtual chassis, one at a time, like line cards added to or removed from a physical chassis.

The communication link 14 between each switch fabric port 32 and an SFC fabric port 24 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 14 can be a direct physical connection (i.e., electrical connectors of the switch fabric ports 32 physically connect directly to electrical connectors of the SFC fabric ports 24).

During operation of the distributed fabric system 20, packets arrive at the network ports 28 of the DLCs 10. For each received packet, one of the network processors 30 of the DLC 10 adds metadata/pre-classification header to the packet. The network processor 30 then partitions the packet into one or more fixed-size cells (e.g., 256 bytes). The network processor 30 sends the cells out through the switch fabric ports 32 to each of the SFCs 12, sending different cells to different SFCs 12. For example, consider an incoming packet with a length of 1600 bytes. The receiving network processor 30 of the DLC 10 can split the packet into four cells of 400 bytes (before adding header information—e.g., 10 bytes—to those cells). The network processor 30 then sends a different cell to each of the four SFCs 12, in effect, achieving a load balancing of the cells across the SFCs 12.

In each SFC 12, a cell-based switch fabric element 22 receives a cell and examines the header of that cell, determines its destination, and sends the cell out through the appropriate one of the SFC fabric ports 24 of that SFC to the destination DLC 10. The destination DLC 10 receives all cells related to the original packet from the SFCs 12, reassembles the original packet (i.e., removing the added headers, combining cells), and sends the reassembled packet out through the appropriate one of its network ports 28. Continuing with the previous four-cell example, consider that each SFC determines that the destination DLC 10 is DLC 10-2. Each SFC 12 sends its cell out through its fabric port 24-2 to the DLC 10-2.

The DLC 10-2 reassembles the packet from the four received cells (the added headers providing an order in which to combine the cells) and sends the packet out of the appropriate network port 28. The pre-classification header information in the cells determines the appropriate network port 28.

The full-mesh configuration of FIG. 2, having the four SFC chassis 12, is a full-line rate configuration, that is, the aggregate bandwidth for transmitting cells from a given DLC 10 to the SFCs (i.e., 480 Gbps) is greater than the aggregate bandwidth of packets arriving at the given DLC 10 on the network ports 28 (i.e., 400 Gbps). The configuration can also be adapted to support various oversubscription permutations for DLCs 10. For example, instead of having four SFCs 12, the distributed fabric system 20 may have only two SFC chassis 12-1, 12-2, with each DLC 10 using only two switch fabric ports 32 for communicating with the SFC chassis 12, one switch fabric port 32 for each of the two SFC chassis 12. This permutation of oversubscription has, for example, each DLC 10 on its network side with an aggregate ingress 400 Gbps bandwidth (forty 10 Gbps Ethernet Ports) and an aggregate egress 240 Gbps cell-switching bandwidth on its two 120 Gbps switch fabric ports 32 for communicating with the two SFCs 12. Other oversubscription permutations can be practiced.

In one embodiment, the DLCs 10 of the distributed fabric system 20 are configured as a single switching domain 40 that includes all of the DLCs 10. In this embodiment, the management and/or control planes can run on a server 16 coupled to one of the network-facing ports 28 of any of the DLCs (here, e.g., DLC 10-1). The cell-based DLCs 10 redirect management and control packets that they receive over their network ports 28 to this server 16 for processing. In the other direction, the server 16 sends management and control packets to the DLCs 10 for transmission out through their network ports 28.

In other embodiments, described further in connection with FIGS. 5-8, the distributed fabric system 20 is partitioned into multiple non-overlapping switching domains; each switching domain being a different subset of one or more DLCs 10, a different subset of the network ports of one or more DLCs, or combinations thereof. Each switching domain can have its management and/or control planes running on one of the servers 16 coupled to a physical network port 28 of a DLC 10 in that switching domain.

Figure 3:
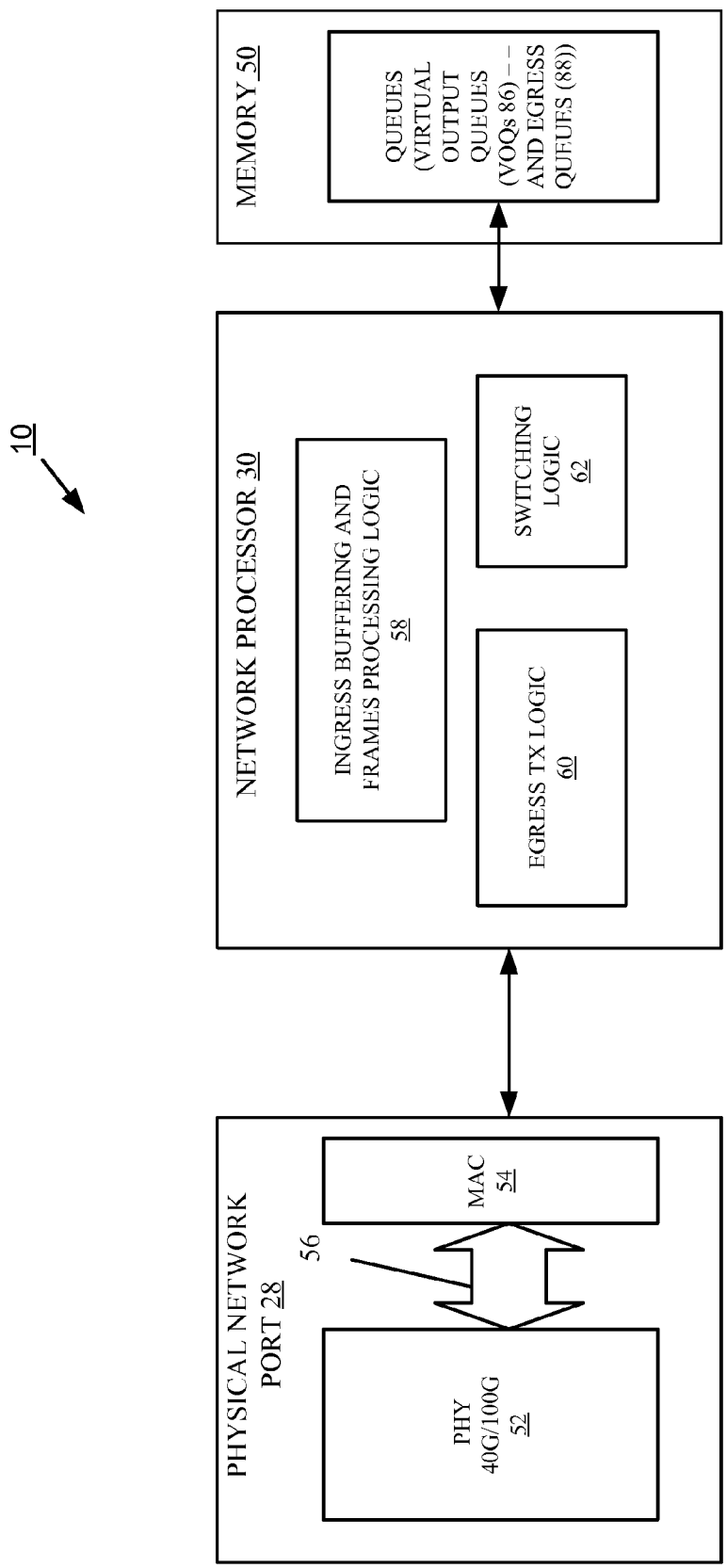
FIG. 3 is a functional block diagram of an embodiment of architecture associated with each physical network port of a switch.

FIG. 3 shows an embodiment of architecture associated with each physical network port 28 of a DLC 10, including a network processor 30 in communication with memory 50. The physical network port 28 (e.g., a 40 G or 100 G Ethernet port) includes a PHY 52 in communication with a MAC sub-layer 54 over serial links 56. To process packets entering and leaving the physical network port 28, the network processor 30 has ingress buffering and frame processing logic 58, egress transmission logic 60, and switching logic 62. The memory 50 provides queues, which include ingress virtual output queues (VOQs) 86 and egress queues 88, as described in FIG. 4. In one embodiment, the memory 50 is part of the network processor 30.

Figure 4:
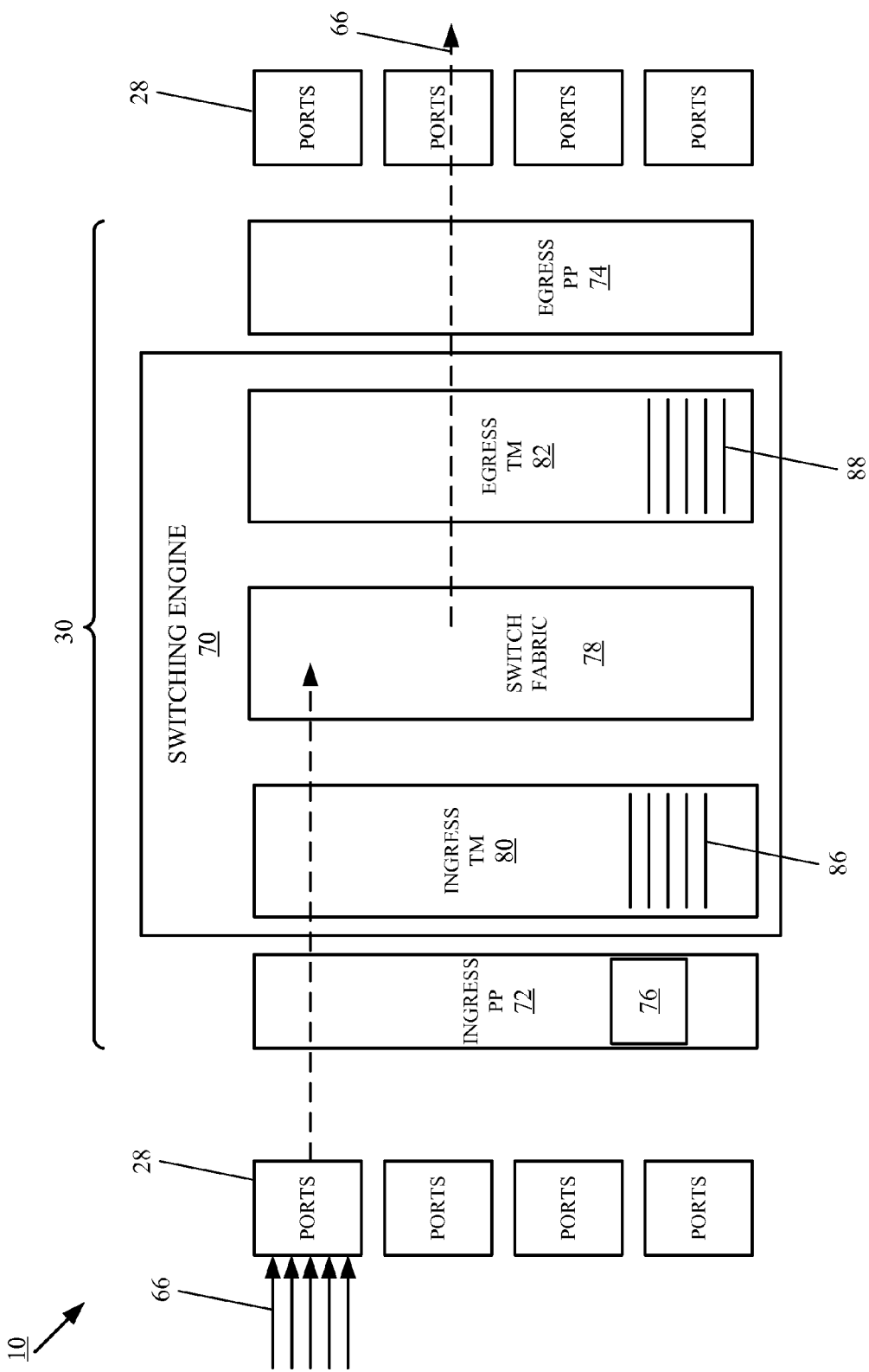
FIG. 4 is a functional block diagram of an embodiment of a switch.

FIG. 4 shows an embodiment of architecture for a DLC 10, including the physical network ports 28 and one of the network processors 30. The switching device (e.g., ASIC) of a DLC 10 usually supports hundreds of physical network ports 28, which can have, for example, 40 G or 100 G bandwidth capabilities. The physical network ports 28 generally share all processing and buffering resources of the switching devices (e.g., ASICs) in the DLC 10. Packets 66 arriving at the DLC 10 come through the physical network ports 28 (in contrast to cells, which arrive and leave the DLC 10 on the switch fabric ports 32 and are not the subject of FIG. 4).

The network processor 30 includes a switching engine 70 and a packet processor having an ingress component (ingress packet processor) 72 and an egress component (egress packet processor) 74. The ingress packet processor 72 includes a look-up engine 76 that manages entries of one or more look up tables of the switching device used to make switching decisions. The switching engine 70 includes a switch fabric 78 and a traffic manager comprised of an ingress component (ingress TM) 80 and an egress component (output TM) 82.

The traffic manager associates each physical network port 28 with one system port. Each system port is a logical entity that is globally unique among all the DLCs 10 connected to same set of SFCs 12. The association between system ports and physical network ports 28 provides a mechanism for uniquely identifying physical network ports 28 within the distributed fabric system 20. Accordingly, any reference herein to a system port encompasses the specific physical network port 28 associated with that system port, and any reference to a physical network port 28 encompasses the globally unique system port associated with that physical network port.

The traffic manager also partitions the physical network ports 28 into virtual ports, referred to as ingress traffic manager (ITM) ports at the ingress side of the network processor 30 and as output traffic manager (OTM) ports at the egress side of the network processor 30. The traffic manager internally divides the resources of the switching device, such as its ingress and egress queues and buffers, among these virtual ports (i.e., the ITM and OTM ports). Each system port is mapped to one ITM port for the ingress TM 80 and to one OTM port for the egress TM 82. The look up table(s) maintain the mapping of physical network ports 28 to system ports, and system ports to ITM ports and OTM ports; all lookup table entries are based on either the OTM port or ITM port. In general, the traffic manager switches packets 66 across the ITM ports and OTM ports, and can manage (e.g., shape, condition, etc.) traffic at the individual virtual port (i.e., ITM, OTM) level.

The ingress and egress traffic managers 80, 82 manage temporary buffering of incoming packets 66 for preprocessing. The ingress TM 80 is independently programmable (i.e., microcode loaded through a microcode facility) to perform various traffic control operations (e.g., priority, buffering, traffic shaping and/or conditioning) based on the source virtual ports of the packets. The ingress TM 80 generates and manages ingress queues 86 (also referred to as virtual output queues or VOQs) for receiving the incoming packets 66. The ingress queues 86 are illustrated as horizontal lines within the ingress TM 80. Each VOQ 86 is exclusively associated with one of the OTM ports, and used exclusively for receiving packets to be switched to that OTM port. Like the ingress TM 80, the egress TM 82 is independently programmable (i.e., microcode loaded through a microcode facility) to perform various traffic control operations (e.g., priority, buffering, traffic shaping and/or conditioning) based on the destination virtual ports of the packets. The egress TM 82 generates and allocates egress queues 88 to the OTM ports, with each OTM port being allocated its own egress queue 88.

Within the network processor 30, the switching destination for a packet 66 is identified by an OTM port and VOQ duple (OTM port, VOQ). For the switching engine 70 to switch packets arriving at a given system port to another system port, the ingress logic 58 (FIG. 3) of the given system port needs to be configured with one or more VOQs associated with the OTM port of the other system port. If the ingress logic of a given system port does not have one or more VOQs for a certain OTM port, that is, the look-up table lacks an entry for the switching destination, the switching engine 70 cannot switch packets to that OTM port (or system port). Such packets destined for such OTM ports may be dropped. In the single switching domain of FIG. 2, the look-up tables associated with all system ports have entries for all OTM ports in all DLCs, and all system ports have VOQs configured for those OTM ports. Accordingly, each system port can thus switch packets to any other system port (OTM port) in the distributed fabric system 20.

The prerequisite that a system port be aware of an OTM port in order to send it packets can also be used to isolate system ports from other system ports and, thus, for partitioning the distributed fabric system 20 into multiple non-overlapping (isolated) switching domains. For instance, in one embodiment, a look-up table associated with each system port of a given DLC (e.g., 10-1) has a table entry for all other OTM ports (and, thus, system ports) in the same given DLC (e.g., 10-1). Each system port in the given DLC 10 is thus able to switch packets to all those other OTM ports in the same given DLC 10. In addition, the system ports of the given DLC (e.g., 10-1) can be configured to be unaware of the OTM ports of the other DLCs (e.g., 10-2, 10-N) connected to the same SFCs 12 by lacking table entries for those other OTM ports. Thus, the system ports of the given DLC (e.g., 10-1) cannot switch packets to those OTM ports of those other DLCs (e.g., 10-2, 10-N), effectively isolating the switching domain embodied by the given DLC (e.g., 10-1) from the one or more switching domains embodied by those other DLCs (e.g., 10-2, 10-N). For isolated switching domains, packets belonging to one switching domain cannot be switched by another switching domain. In addition, these principles can extend to partitioning an individual DLC into multiple switching domains by configuring some of the system ports (i.e., their associated physical network ports 28) of the DLC so that they cannot see, and therefore cannot switch packets to, other system ports within the same DLC.

In addition, all the servers 16 (FIG. 1) connected to a physical network port 28 mapped to a system ports of the given DLC (e.g., 10-1) form a virtual POD (i.e., a Point of Delivery). A virtual POD can be managed independently by running the control plane and/or management plane on one of the directly attached servers 16. The servers 16 of one virtual POD are isolated from servers 16 in another virtual POD; that is, servers 16 in different virtual PODs cannot send and receive packets from each other. Thus, an individual customer can own a virtual POD at a hosted data center. Each virtual POD within the distributed fabric system 20 provides complete feature set of the flat data center switch, but all virtual PODs share the same set of SFCs 12.

Each packet 66 arriving at a physical network port 28 is processed by the ingress logic 58 of the associated system port. The ingress and egress packet processors 72, 74 determine the ITM port and OTM port for each packet. In brief, the ingress packet processor 72 performs conversions from source network ports 28 to ITM ports and from ITM ports to OTM ports, and the egress packet processor 74 performs conversions from OTM ports to destination network ports 28.

Each packet 66 arriving at a physical network port 28 has a header and a payload. The ingress packet processor 72 parses the packet 66. Based on information in the packet header, the look-up engine 76 of the ingress packet processor 72 determines the ITM port assigned to the packet. Based on this ITM port, the ingress packet processor 72 employs the look-up engine 76 to determine a destination physical network port 28 for the packet 66, and a destination OTM port and VOQ 86 for the packet based on the destination physical network port 28. When a DLC (e.g., 10-1) does not know the OTM ports of the other DLCs, the lookup logic is certain not to send packets to those other DLCs, which operates to partition the distributed fabric system 20 into smaller isolated switching domains.

In addition, the ingress packet processor 72 adds a pre-classification header to each packet 66. At the ingress pre-classification of packets, the network processor 30 considers the ITM port that is assigned to the packets to be the ingress port, rather than the high-bandwidth physical network port 28 through which the packets arrived. Microcode logic of the network processor 30 determines the assigned ITM port based on information carried by certain (predetermined) fields in the packet (e.g., the S-tag in Ethernet standard packet). The pre-classification header carries information about the ITM port. In one embodiment, the pre-classification header includes, but is not limited to, fields for the ITM port, the source VLAN, a QoS for the packet, statistics pointers, and the destination OTM port.

The ingress packet processor 72 can forward the packet 66 to the ingress TM 80 by placing the packet (or a pointer to that packet) into the VOQ 86 associated with the destination OTM port. Alternatively, the ingress TM 80 can move the packet 66 to the appropriate VOQ 86 based on the ITM port or OTM port in the pre-classification header of the packet. Because the destination identified by the duple (OTM port, VOQ) resides within the same virtual POD, packets are not forwarded internally to other virtual PODs.

The switch fabric 78 takes the packets from the VOQs 86 and switches them to the egress TM 82 based on the pre-classification header contents. In the transfer of packets from the ingress queues 86 to the egress queues 88, the ingress and egress packet processors 86, 88 can engage in a handshaking process. The ingress packet processor 72 signals to the egress packet processor 74 that it has a packet for transfer. In response, the ingress packet processor 72 receives credit. When sufficient credit is acquired, the ingress packet processor 72 sends the packet to the egress packet processor 74.

The egress TM 82 interacts with the OTM port to make sure the packets residing in the VOQs 86 are delivered to their destinations. For this operation, the packets 66 may leave the DLC 10 through the switch fabric ports 32 (FIG. 2), travel through the SFCs 12 in the form of cells, and return to the destination DLC (which can be the same as the source DLC) through its switch fabric ports 32, as described in connection with FIG. 2.

When packets 66 are to be sent out of the physical network ports 28, the egress packet processor 74 performs conversions from destination OTM ports to physical network ports 28, taking packets from the egress queues 88 and forwarding them to their destination physical network ports 28 based on the destination OTM ports. The egress packet processor 74 may remove the pre-classification header from each packet before forwarding that packet to a destination physical network port 28 (or the destination physical port 28 can remove the pre-classification header).

Figure 5:
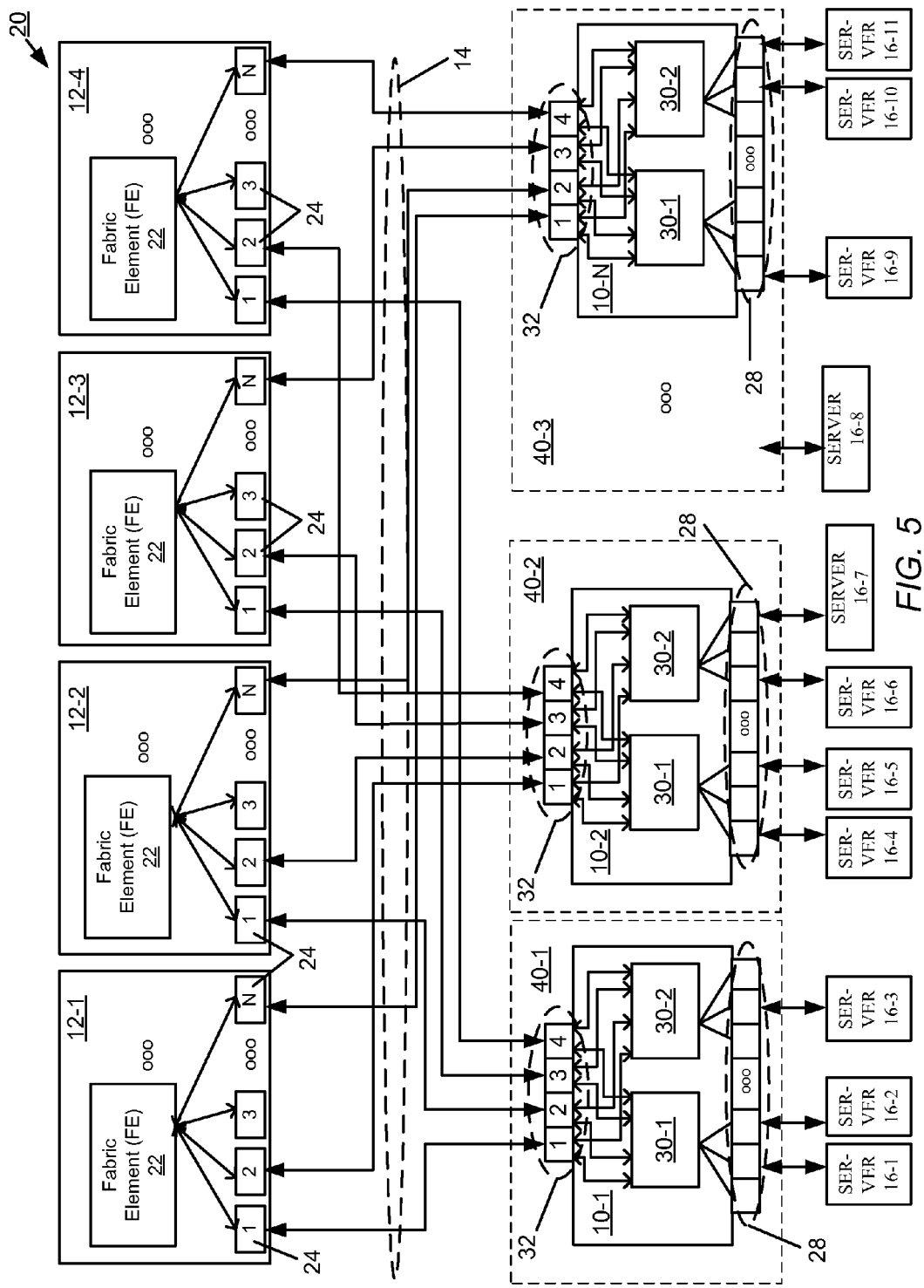
FIG. 5 is a functional block diagram of the distributed fabric system of FIG. 2 partitioned into multiple non-overlapping switching domains.

FIG. 5 shows an embodiment of the cell-based distributed fabric system 20 of FIG. 2 partitioned into multiple switching domains 40-1, 40-2, and 40-3 in accordance with the principles described herein. Each of the switching domains 40-1 and 40-2 is comprised of a single DLC 10, and the switching domain 40-3 is comprised of multiple DLCs. For example, the switching domain 40-1 consists of only one DLC, specifically DLC 10-1. The system ports of the DLC 10-1 are aware of the OTM ports of the DLC 10-1 only, and are not configured with lookup table entries or VOQs for any OTM ports of the other DLCs 10-2, DLC-N. The servers 16-1, 16-2, and 16-3 connected to the network ports 28 of DLC 10-1 are part of a virtual POD, the boundaries of which the DLC 10-1 establishes. Any of such servers 16-1, 16-2, and 16-3 can run the control plane and/or management planes for the switching domain 40-1.

Similarly, the switching domain 40-2 consists of only one DLC, specifically DLC 10-2, because the system ports of DLC 10-2 are aware of the OTM ports of the DLC 10-2 only, and are not configured with lookup table entries or VOQs for any OTM ports of the other DLCs 10-1, DLC-N. The virtual POD produced by the switching domain 40-2 includes the servers 16-4, 16-5, 16-6, and 16-7, which are attached to network ports 28 of the DLC 10-2. The control plane and/or management planes for the switching domain 40-2 can run on any of such servers 16-4, 16-5, 16-6, and 16-7 (independently of the control and/or management planes running on one of the servers for the other switching domains 40-1, 40-3).

The switching domain 40-3 includes multiple DLCs, including DLC-N and one or more other DLCs represented by the ellipsis ( . . . ). The system ports of each DLC in the switching domain 40-3 know the OTM ports of each other DLC in the switching domain 40-3, and are not configured with lookup table entries or VOQs for any OTM ports of the other DLCs 10-1, DLC 10-2. The virtual POD produced by the switching domain 40-3 includes the server 16-8 connected to the network ports 28 of a DLC (encompassed by the ellipsis) and the servers 16-9, 16-10, and 16-11 connected to the network ports 28 of the DLC 10-N. Any of such servers 16-8, 16-9, 16-10, and 16-11 can run the control plane and/or management planes for the switching domain 40-3 (independently of the control and/or management planes for the other switching domains 40-1, 40-2).

Figure 6:
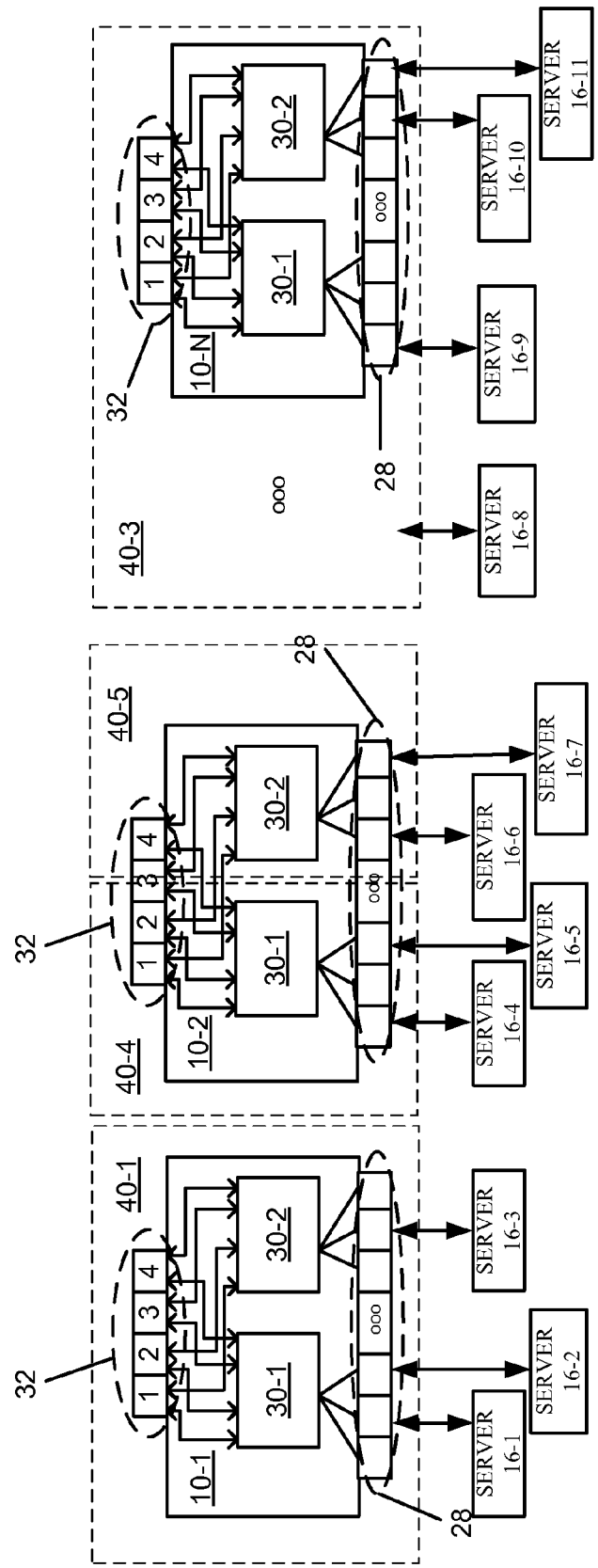
FIG. 6 is a block diagram of the distributed fabric system of FIG. 2 wherein, for example, a single DLC is partitioned into multiple non-overlapping switching domains.
Figure 7:
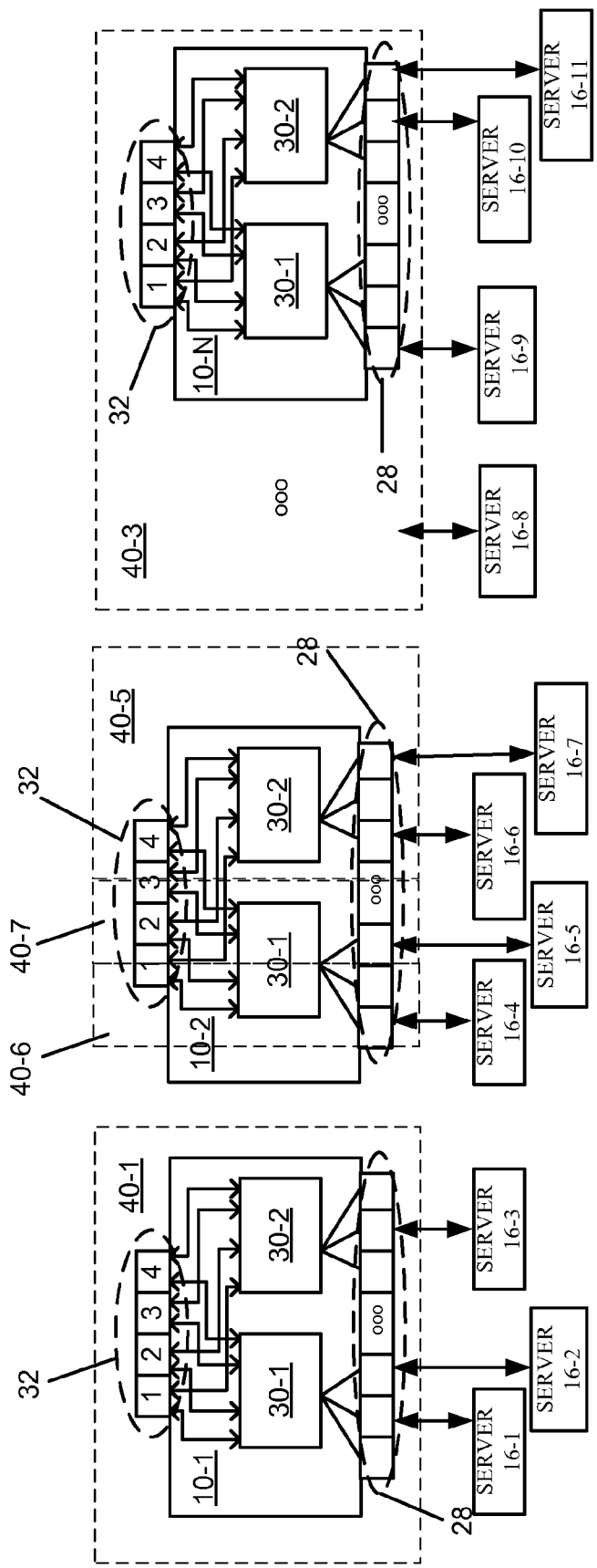
FIG. 7 is a block diagram of the distributed fabric system of FIG. 2, illustrating another example of a single DLC partitioned into multiple non-overlapping switching domains.
Figure 8:
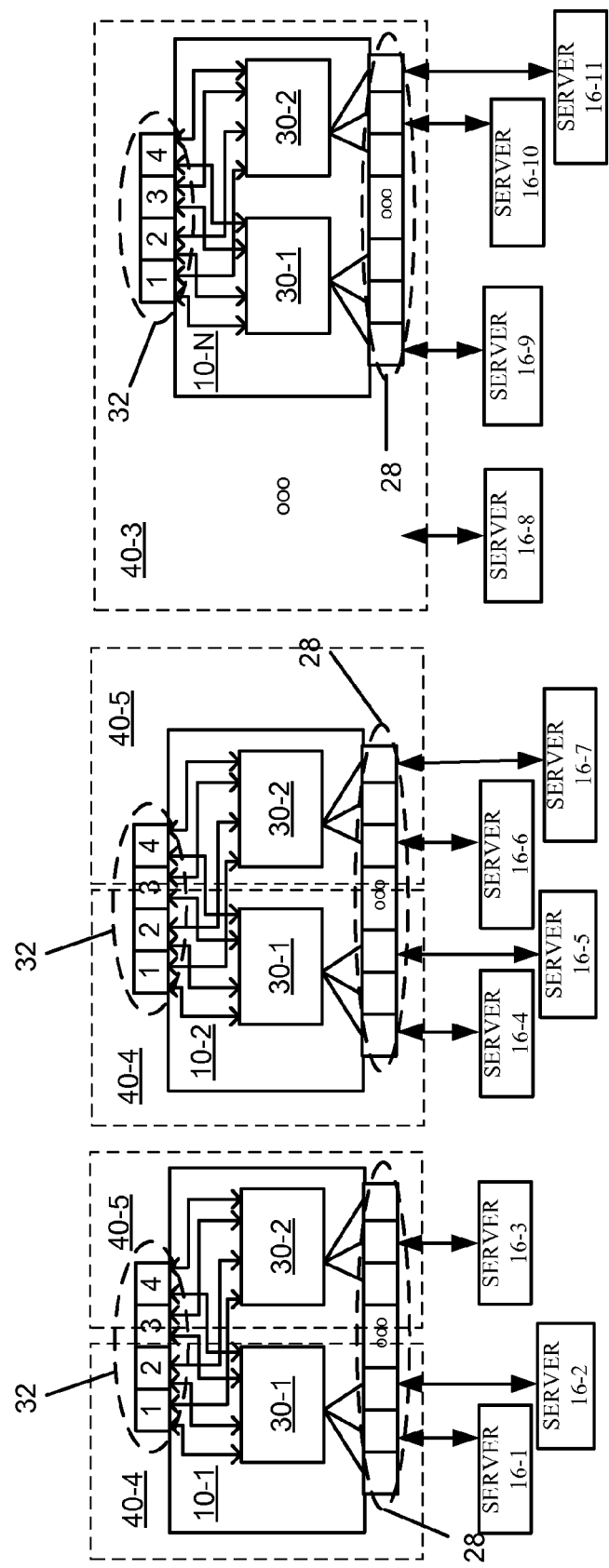
FIG. 8 is a block diagram of the distributed fabric system of FIG. 2 wherein, for example, multiple DLCs are partitioned into multiple non-overlapping switching domains, with each of such switching domains spanning the multiple DLCs.

FIG. 6, FIG. 7, and FIG. 8 show alternative example embodiments of switching domain partitions for the cell-based distributed fabric system 20 of FIG. 2 (only the DLCs 10 and servers 16 being shown for simplicity sake). The embodiments shown in FIG. 6, FIG. 7, and FIG. 8 are examples; other combinations of partitions can be produced without departing from the principles described herein.

In FIG. 6, the DLC 10-2 is partitioned into two switching domains 40-4, 40-5 (the partitions 40-1 and 40-3 are unchanged from FIG. 5). In this example, the network processors 30-1, 30-2 of DLC 10-2 define the boundaries of the partitions 40-4, 40-5; that is, the physical network ports 28 connected to network processor 30-1 are configured to be in the switching domain 40-4, and the physical network ports 28 connected to network processor 30-2 are configured to be in the switching domain 40-5. The intent of the dashed boxes is to show abstractly the boundaries of the switching domains 40-4, 40-5, although it is to be understood that the switching domains 40-4, 40-5 share all of the fabric ports 32 of the DLC 10-2. Either server 16-4 or 16-5 can manage the control and/or management planes for the switching domain 40-4. Similarly, either server 16-6 or 16-7 can manage the control and/or management planes for the switching domain 40-5 (independently of the control and/or management planes of the switching domain 40-4).

FIG. 7 illustrates that partitioning can occur along boundaries defined by subsets (or groups) of the network ports connected to a network processor (e.g., 30-1). In FIG. 7, the configuration of the network ports 28 of DLC 10-2 produces three partitions 40-5, 40-6, and 40-7. These switching domains 40-5, 40-6, and 40-7 share all of the fabric ports 32 of the DLC 10-2. Some of the physical network ports 28 connected to network processor 30-1 are configured to be in the switching domain 40-6, the other physical network ports 28 connected to network processor 30-1 are configured to be in the switching domain 40-7, and all of the physical network ports 28 connected to network processor 30-2 are configured to be in the switching domain 40-5. The control and/or management planes for the switching domain 40-6 can run on the server 16-4, while the control and/or management planes for the switching domain 40-7 can run on the server 16-5.

In FIG. 8, both of the two switching domains 40-4, 40-5 of FIG. 6 span the two DLCs 10-1, 10-2. Within each DLC 10-1, 10-2, the network processors 30-1, 30-2 define the boundaries of the partitions 40-4, 40-5. The physical network ports 28 connected to network processor 30-1 of each DLC 10-1, 10-2 are configured to be in the switching domain 40-4, and the physical network ports 28 connected to network processor 30-2 of each DLC 10-1, 10-2 are configured to be in the switching domain 40-5. The switching domains 40-4, 40-5 share all of the fabric ports 32 of the DLCs 10-1 and 10-2. Any of the servers 16-1, 16-2, 16-4, 16-5 connected to a network port 28 that is configured to be part of the switching domain 40-4 can manage the control and/or management planes for the switching domain 40-4. Similarly, any of the servers 16-3, 16-6, 16-7 can manage the control and/or management planes for the switching domain 40-5.

Figure 9:
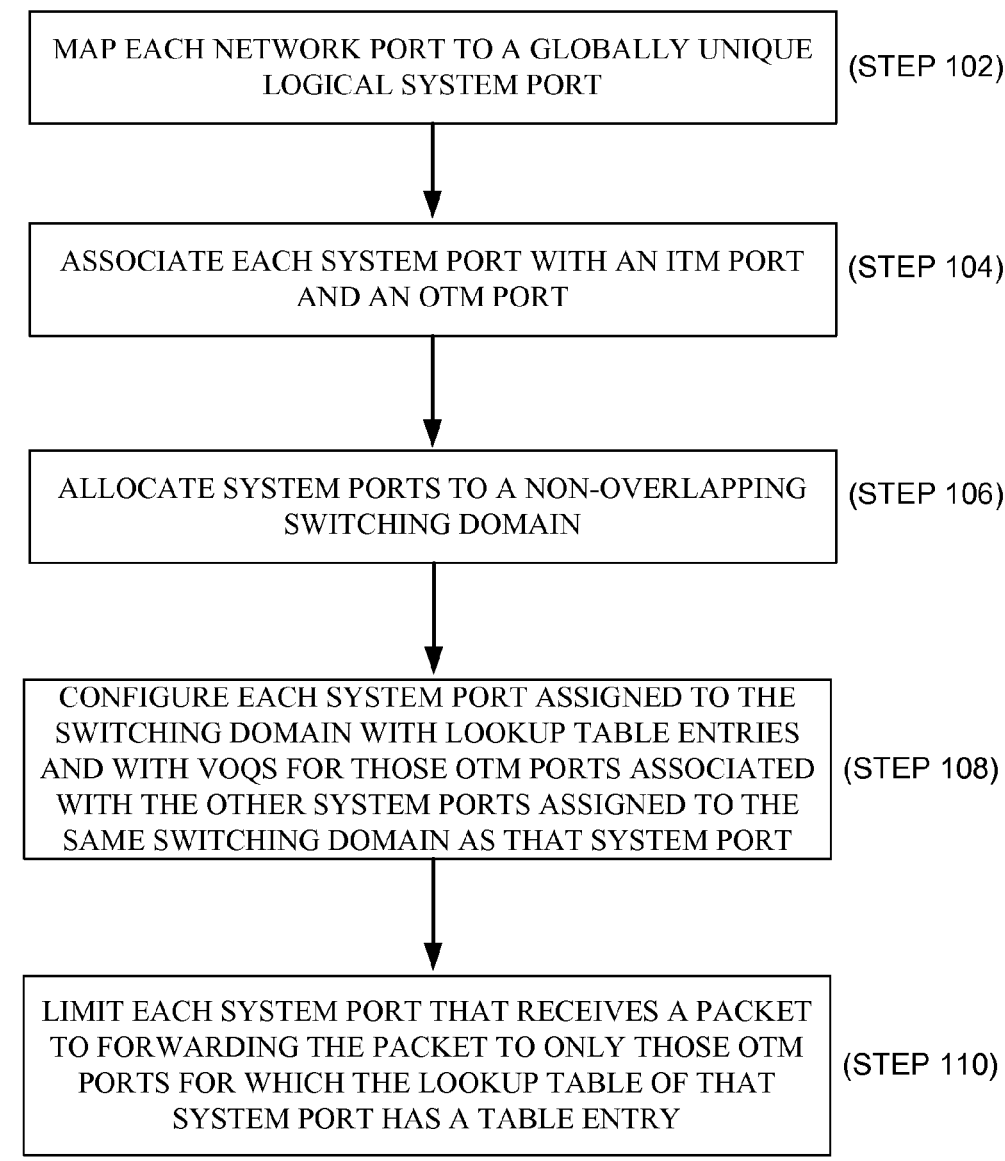
FIG. 9 is a flow diagram illustrating an embodiment of a process for partitioning a cell-based distributed fabric system into multiple switching domains.

FIG. 9 shows an embodiment of a process 100 for partitioning a distributed fabric system into multiple non-overlapping switching domains. At step 102, each physical network port 28 of the switching devices (ASICS) in the DLCs 10 within the distributed fabric system 20 is mapped to a globally unique logical system port. Each system port is associated with (step 104) an ITM port and an OTM port. The ITM and OTM ports for the network ports can be generated statically, which can occur at boot time of the DLC in accordance with a configuration file.

System ports (and, thus, by association, their associated network ports) are allocated (step 106) to a non-overlapping switching domain. For example, a data center administrator can determine to allocate a particular DLC (e.g., 10-2) to a switching domain in order to provide a virtual POD for a particular customer. If the particular DLC is to define the switching domain boundary, then each system port of the DLC is effectively allocated to that switching domain. Alternatively, the administrator may determine that only certain system ports of the particular DLC are to be allocated to that switching domain, whereas other system ports of the DLC are to be allocated to another switching domain (i.e., the system ports themselves, rather than the DLC, define the switching domain boundaries). As another option, the administrator may determine that the switching domain is to span multiple DLCs, whereas each system port of those multiple DLCs is allocated to this switching domain.

To enable switching packets between network ports 28 in the switching domain, each system port allocated to the switching domain is configured (step 108) with lookup table entries and ingress queues (VOQs) 86 for those OTM ports associated with the other system ports allocated to the same switching domain as that system port. To keep packet traffic belonging to the switching domain within the boundaries of the switching domain, each system port that receives a packet is limited to forwarding (step 110) the packet to only those OTM ports for which the lookup table associated with that system port is configured with an ingress queue (VOQ). The lookup tables of the ingress packet processor 72 can be used to achieve this constraint on packet forwarding. For instance, if a system port does not have a particular OTM port in its lookup tables, the system port cannot see the OTM port in order to forward packets to it.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for partitioning a distributed fabric system, the method comprising:
providing a plurality of switches that each link a packet-based network to the distributed fabric network;
allocating at least one of the plurality of switches to each of a plurality of non-overlapping switching domains;
allocating at least one system port to each switching domain;
producing multiple different look-up tables, wherein each look-up table corresponds to a different switching domain of the multiple non-overlapping switching domains in the distributed fabric system; and
associating each system port with the look-up table of the multiple look-up tables that corresponds to the switching domain to which that system port is allocated, the look-up table associated with each system port having at least one table entry for each other system port allocated to the same switching domain as that system port.

2. The method of claim 1, further comprising limiting each switch in the distributed fabric system that receives a packet over a given system port to switching the packet to only those other system ports for which the look-up table associated with the given system port has a table entry.

3. The method of claim 1, further comprising:
associating each system port with its own ingress traffic manager (ITM) port and with its own output traffic manager (OTM) port; and configuring each system port with at least one virtual output queue for each OTM port associated with another system port to be allocated to the same switching domain as that system port.

4. The method of claim 1, further comprising centrally managing, in each of the non-overlapping switching domains, a control plane on a server connected to a physical network port of a switch in that non-overlapping switching domain.

5. The method of claim 1, further comprising configuring one of the non-overlapping switching domains to include only one switch in the distributed fabric system.

6. The method of claim 1, further comprising configuring one of the non-overlapping switching domains to include only a subset of the system ports in one or more of switches in the distributed fabric system.

7. The method of claim 1, further comprising configuring one of the non-overlapping switching domains to include all of the system ports of more than one and fewer than all of the switches in the distributed fabric system.

8. The method of claim 1, further comprising switching a packet received over a given system port if a destination of the packet is one of the other system ports for which the look-up table associated with the given system port has a corresponding table entry, and dropping the packet if the look-up table of the given system port lacks a corresponding table entry for the destination of the packet.

9. A switch of a switching domain of a plurality of non-overlapping switching domains that link a packet-based network to a fabric network comprising:
 a plurality of system ports;
 a plurality of network ports that communicate with the packet-based network;
 a plurality of fabric ports that communicate with the fabric network;
 a network processor including:
  logic to allocate at least one system port to at least one network port of each switching domain;
  logic to produce multiple different look-up tables, wherein each look-up table corresponds to a different switching domain of the multiple non-overlapping switching domains in the distributed fabric system; and
  logic to associate each system port with the look-up table of the multiple look-up tables that corresponds to the switching domain to which that system port is allocated, the look-up table associated with each system port having at least one table entry for each other system port allocated to the same switching domain as that system port.

10. The switch of claim 9, wherein the network processor further comprises logic to limit switching a packet received over a given system port to only those other system ports for which the look-up table associated with the given system port has a table entry.

11. The switch of claim 9, further comprising memory configured to provide a plurality of virtual output queues, and wherein the network processor further comprises:
 logic to associate each system port with its own ingress traffic manager (ITM) port and with its own output traffic manager (OTM) port; and
 logic to configure each system port with at least one virtual output queue for each OTM port associated with another system port to be allocated to the same switching domain as that system port.

12. The switch of claim 9, wherein the look-up table associated with a given system port has at least one table entry for all other system ports in the switch and lacks table entries for any other system ports that are mapped to physical network ports on another switch.

13. The switch of claim 9, wherein the look-up table associated with a given system port has at least one table entry for only a subset of the system ports of the switch.

14. The switch of claim 9, wherein the look-up table associated with a given system port has at least one table entry for one or more other system ports that are mapped to physical network ports on another switch.

15. The switch of claim 9, wherein the network processor further comprises logic to switch a packet received over a given system port if a destination of the packet is one of the other system ports for which the look-up table associated with the given system port has a corresponding table entry, and dropping the packet if the look-up table associated with the given system port lacks a corresponding table entry for the destination of the packet.

16. A distributed fabric system which communicates with a packet-based network comprising:
 a plurality of scaled-out fabric coupler (SFC) chassis in a fabric network, each SFC chassis having a plurality of cell-based SFC fabric ports and a cell-based fabric element for switching cells among the cell-based SFC fabric ports of that SFC chassis; and
 a plurality of switching distributed line cards ("DLCs") each adapted to link the packet-based network to the fabric network, each switching DLC including:
  a plurality of cell-based DLC fabric ports connecting that switching DLC to each of the SFC chassis through the fabric network; and
  a network processor in communication with the plurality of cell-based DLC fabric ports, the network processor including:
   logic to allocate at least one of the plurality of switching DLCs to a plurality of non-overlapping switching domains;
   logic to allocate at least one system port to each switching domain;
   logic to produce multiple different look-up tables, wherein each look-up table corresponds to a different switching domain of the multiple non-overlapping switching domains in the distributed fabric system; and
   logic to associate each system port with the look-up table of the multiple look-up tables that corresponds to the switching domain to which that system port is allocated, the look-up table associated with each system port having at least one table entry for each other system port allocated to the same switching domain as that system port.

17. The distributed fabric system of claim 16, wherein each switching DLC further comprises a plurality of physical network ports, and wherein the network processor of each switching DLC further comprises logic to uniquely map each system port to one physical network port of the plurality of physical network ports.

18. The distributed fabric system of claim 16, wherein the network processor of each switching DLC further comprises logic to limit switching a packet received over a given system port to only those other system ports for which the look-up table associated with the given system port has a table entry.

19. The distributed fabric system of claim 16, further comprising memory configured to provide a plurality of virtual output queues, and wherein the network processor of each switching DLC further comprises:

logic to associate each system port of that switching DLC with its own ingress traffic manager (ITM) port and with its own output traffic manager (OTM) port; and logic to configure each system port of that switching DLC with at least one virtual output queue for each OTM port associated with another system port to be allocated to the same switching domain as that system port.

20. The distributed fabric system of claim 16, further comprising a server, for each switching domain, connected to a network port of a given switching DLC in that switching domain, the server for each switching domain independently managing a control plane for that switching domain.

21. The distributed fabric system of claim 16, wherein at least one of the non-overlapping switching domains includes only one of the DLCs in the distributed fabric system.

22. The distributed fabric system of claim 16, wherein at least one of the non-overlapping switching domains includes only a subset of the system ports in one or more of the switching DLCs.

23. The distributed fabric system of claim 16, wherein at least one of the non-overlapping switching domains spans more than one and fewer than all of the switching DLCs in the distributed fabric system.

\* \* \* \* \*